(12) United States Patent
Hulvey et al.

(10) Patent No.: US 8,027,639 B2
(45) Date of Patent: Sep. 27, 2011

(54) SYSTEM AND METHOD FOR SECURE SHORT-RANGE COMMUNICATION

(75) Inventors: Robert William Hulvey, Redondo Beach, CA (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 762 days.

(21) Appl. No.: 11/959,588

(22) Filed: Dec. 19, 2007

(65) Prior Publication Data

US 2008/0146152 A1    Jun. 19, 2008

Related U.S. Application Data

(60) Provisional application No. 60/875,542, filed on Dec. 19, 2006.

(51) Int. Cl.
*H04B 7/00* (2006.01)

(52) U.S. Cl. ............... 455/41.2; 455/63.3; 455/63.4; 343/726; 343/876

(58) Field of Classification Search ............ 455/41.2, 455/63.3, 63.4; 343/726, 876, 893
See application file for complete search history.

(56) References Cited

U.S. PATENT DOCUMENTS

| | | | |
|---|---|---|---|
| 6,900,773 B2 * | 5/2005 | Poilasne et al. | 343/795 |
| 7,319,393 B2 * | 1/2008 | Forster | 340/572.1 |
| 7,551,930 B2 * | 6/2009 | Lempio et al. | 455/456.3 |

* cited by examiner

*Primary Examiner* — Tuan H Nguyen
(74) *Attorney, Agent, or Firm* — Duane S. Kobayashi

(57) ABSTRACT

A system and method for enabling secure short-range communication. A close proximity transmitter is used that is designed with a relatively poor radiator as compared to a conventional transmitter supporting conventional transmissions such as mobile phone communications, Wi-Fi, or Bluetooth communication. The close-proximity transmitter and the conventional transmitter are selectively activated based on a communication mode.

16 Claims, 3 Drawing Sheets

SYSTEM AND METHOD FOR SECURE SHORT-RANGE COMMUNICATION

This application claims priority to provisional application No. 60/875,542, filed Dec. 19, 2006, which is incorporated by reference herein, in its entirety, for all purposes.

BACKGROUND

1. Field of the Invention

The present invention relates generally to secure communication and, more particularly, to a system and method for secure short-range communication.

2. Introduction

Short-range wireless communication systems, such as those implementing Bluetooth technology, have provided great flexibility in reducing a user's dependence on wired cable connections. While user convenience has increased, so also has the increased security risk in exposing the communication session to eavesdropping or other subversive activities. In various implementations, short-range wireless communication systems have increased security through the use of passwords, encryption, or the like.

What is needed therefore is a mechanism that maintains the ease of use of wireless connectivity while also maintaining a high level of security for the short-range communication session.

SUMMARY

A system and/or method for secure short-range communication, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
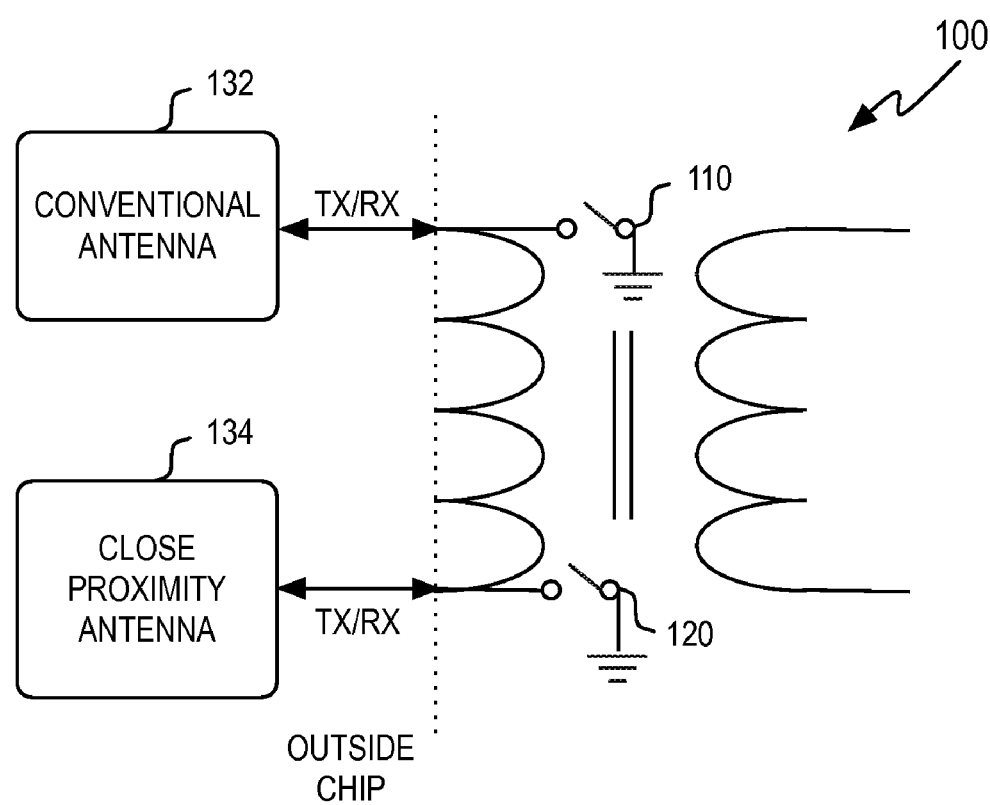
FIG. 1 illustrates an embodiment of coupling a communication path to one of two antennas.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Wireless communications is generally facilitated by an antenna, which is an electrical device designed to transmit or receive electromagnetic waves. During transmission, an arrangement of conductors forming the antenna generate a radiating electromagnetic field in response to an applied alternating voltage and the associated alternating electric current. During reception, the antenna is placed in an electromagnetic field that induces an alternating current in the arrangement of conductors and a voltage between its terminals.

Antennas can be viewed as "transformers" that match the impedance of an electronic circuit to the impedance of "free space". This impedance match is typically tuned to a given range of frequencies, and energy is then transferred from the circuit to "space". One of the goals of the antenna design process is to maximize the radiation of an electromagnetic field over a given frequency range.

In this conventional antenna design process, the efficiency of the transfer to "space" enables a greater range of communication. While this design goal is laudable in enabling a greater operating range for portable devices (e.g., mobile phones), it does create increased security risks. One form of security risk is evident in the number of individuals that can receive the wireless transmission. Quite simply, the greater the number of individuals that can receive the wireless communication, the higher the inherent security risk.

To illustrate this concept, consider the benefits of Bluetooth technology. In general, Bluetooth enables wireless personal area networks that provide users with a way to connect and exchange information between devices such as personal digital assistants (PDAs), mobile phones, laptops, PCs, printers, digital cameras, video game consoles, kiosks, etc. Class 2 Bluetooth devices typically have a range of roughly 10 meters. Although the short range of Bluetooth generally reduces security risks, an individual with subversive intent can use specialized equipment to eavesdrop or engage in active attacks over a range which is much longer than the normal expected operating range. For example, an attacking device can be designed with a highly sensitive receiver or high power transmitter to achieve longer range. As another example, highly directional antennas may be used to achieve longer range.

In the Bluetooth standard, security in the short-range communication links can be facilitated by PIN-based pairing. It has been shown, however, that PIN-based pairing with commonly used short PIN codes can be compromised by passive attacks where a suitably equipped attacker eavesdrops communications at the time of initial pairing. Active attacks can also be used where a specially constructed message is inserted at a specific point in the protocol to make the master and slave repeat the pairing process. To rectify these vulnerabilities, stronger, asymmetric key establishment has been considered, though active attacks such as "man in the middle" attacks are still possible.

As these examples illustrate, security is still a concern even for short-range communication links. Conventional solutions that seek to address vulnerabilities in the communication protocol inevitably increase the complexity of the process, thereby decreasing the ease of use of such devices.

In accordance with the present invention, security in short-range communication links is increased without sacrificing ease of use. Specifically, the present invention improves security in short-range communication links by focusing on the characteristics of the antenna used to transmit and receive information.

As noted above, conventional antenna designs seek to match the impedance of an electronic circuit to the impedance of "free space" for a given range of frequencies. It is typical to optimize antennas to achieve what are known in the art as good "far field" radiation properties. However, objects brought near the antenna can therefore "detune" it, causing the match to become poor and resulting in poor communication efficiency. Such changes in the radiation properties of antennas which are close together are referred to in the art as "near field effects". In one example, an "antenna" can be intentionally designed to be a poor radiator at the desired communication frequency, while becoming a good radiator when brought close to a complementary antenna. When the complementary antennas are close in proximity, energy can then be coupled between the similar antennas. This energy coupling can be used to facilitate communication.

It is feature of the present invention that characteristics of such a "poor" antenna design can be used to facilitate short-range communication with increased security. In particular, it is a feature of the present invention that a short-range communication link with increased security can be facilitated by a close proximity transmitter/receiver that is designed specifically for a short-range communication mode. This close-proximity transmitter/receiver would complement a second transmitter/receiver that is designed to facilitate conventional communication (e.g., to a remote location). In combination, the two transmitters/receivers would be selectively activated to enable two distinct modes of communication.

To illustrate the features of the present invention, reference is now made to the embodiment illustrated in FIG. 1. As illustrated, transceiver environment 100 includes a transformer that couples energy between antennas 132, 134 and electronic circuitry in a chip. Antenna 132 is a conventional antenna that is designed to facilitate conventional communication such as mobile phone communication, Wi-Fi communication, Bluetooth communication, or the like. Antenna 134, on the other hand, is a close-proximity antenna that is designed to facilitate close-proximity communication between devices that are physically near each other. For example, close-proximity antenna can be designed to facilitate communication between a mobile phone and a variety of devices such as a headset, personal digital assistant, kiosk, etc.

Also included in transceiver environment 100 are switches 110 and 120. In combination, switches 110 and 120 enable control of the activation/deactivation of antennas 132, 134. Control of this activation/deactivation can be based on a communication mode of the device that incorporates transceiver environment 100. For example, when the device is in a conventional communication mode, switch 110 can be opened and switch 120 would be closed. Conversely, when the device is in a close-proximity communication mode, switch 110 can be closed and switch 120 would be opened. As would be appreciated, other switching designs can be embodied in transceiver environment 100 to enable selective activation of a particular antenna 132, 134.

In one embodiment, close-proximity antenna 134 is deliberately designed to be a very poor radiator in general, but becomes much better when the antenna is brought into proximity with another antenna with complementary characteristics. As a result, close-proximity antenna 134 would not be effective in communicating unless a complementary close-proximity device is present. This condition provides security benefits since it limits the potential communication partners by design. As an example, a simple metal plate can be designed which is a poor antenna in the conventional "far field" sense, but which can capacitively couple a signal when placed close to another similar metal plate.

Figure 2:
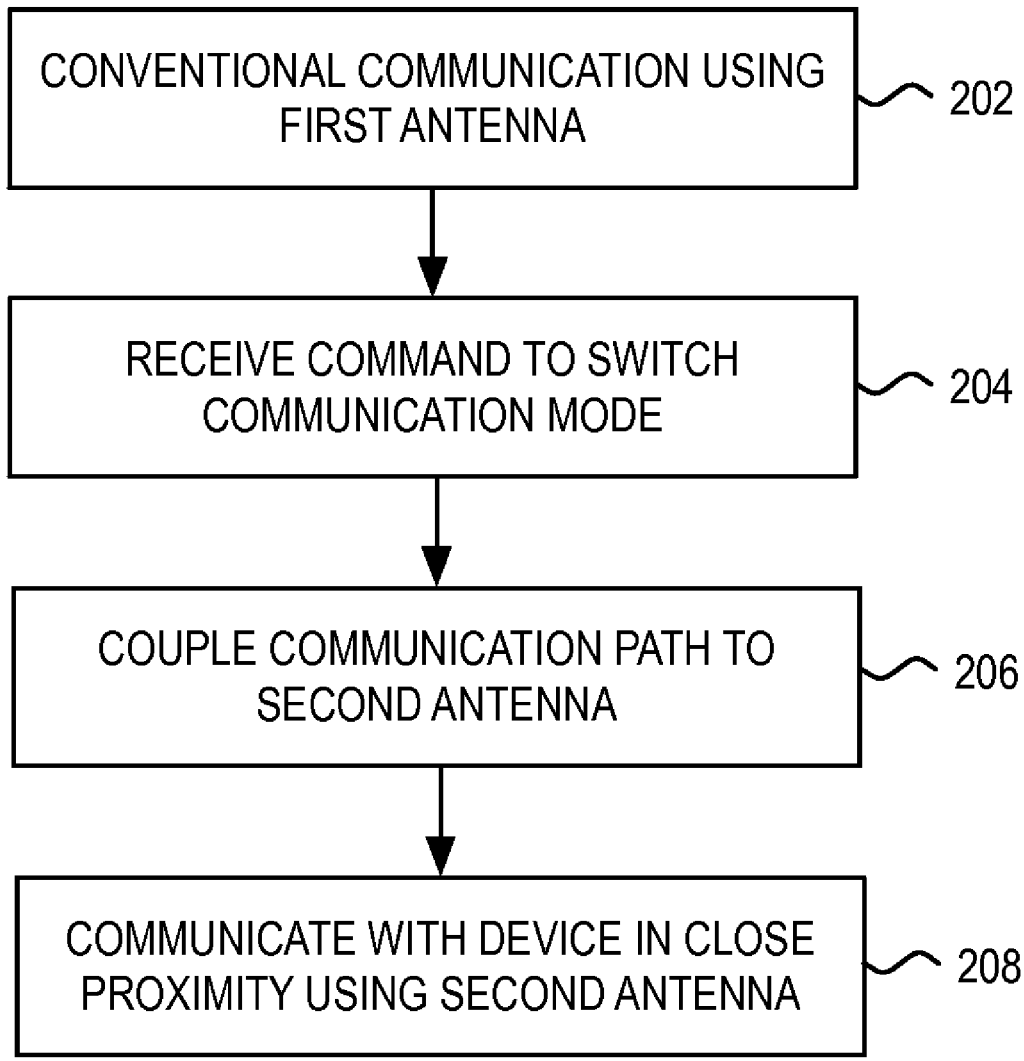
FIG. 2 illustrates a flowchart of a process of communicating using two antennas.

To illustrate the operation of the principles of the present invention, reference is now made to the flowchart of FIG. 2. As illustrated, the process begins at step 202 where a device is in a first communication mode for conventional communication using a first antenna. In various examples, this conventional communication can represent conventional mobile phone communication, Wi-Fi communication, Bluetooth communication, etc.

Next, at step 204, the device receives a command to the switch communication mode into a close-proximity communication mode. This close-proximity communication mode can be used to support the communication of confidential information such as bank account information, security keys, or the like. For example, the close-proximity communication mode can be used when two wireless devices initially establish a communication link. Here, the close-proximity communication mode can be used in conjunction with Bluetooth or Wi-Fi protocols, to securely establish security keys to be used in subsequent communications. For example, public-private key (PPK) cryptography is typically vulnerable to active man-in-the-middle attacks, but is highly resistant to passive eavesdropping attacks. With the short-range limitations of the present invention, while passive eavesdropping may still be possible with specialized equipment, mounting an active man-in-the-middle attack would be extremely difficult. Hence, the principles of the present invention are highly complementary with PPK cryptography methods of establishing security keys, wherein public keys are transferred "in the clear" since passive eavesdropping is not a significant threat.

At step 206, after the command to switch communication modes is received, the device would then proceed to couple the communication path to a second antenna that is designed for close-proximity communication. For example, in the context of the embodiment of FIG. 1, the device would close switch 110 and open switch 120. By this action, conventional antenna 132 is deactivated and close-proximity antenna 134 is activated. Finally, at step 208, the device can then commence close-proximity communication using the second antenna.

As noted above, a close-proximity antenna can be intentionally designed to be a poor "far field" radiator at the desired communication frequency, while becoming a good "near field" radiator when brought close to another similar antenna. At its simplest, such an antenna can be embodied as a plate of metal that operates similarly to a plate of a capacitor. By design, this plate of metal would be a poor radiator when operating alone, but would be a good radiator when operating in cooperation with another plate of metal installed in another device. As would be appreciated, various other antennas can be designed that would exhibit the design characteristics noted above.

Figure 3:
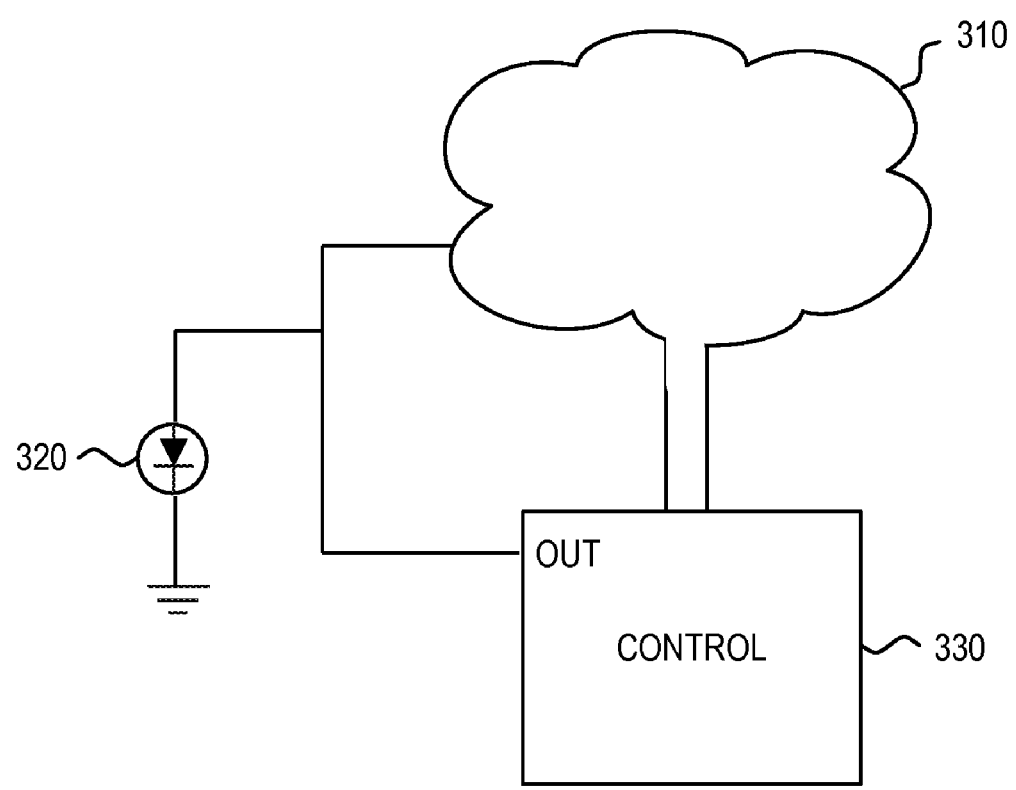
FIG. 3 illustrates an embodiment of a mechanism for altering a characteristic of an antenna.

In a further embodiment, the characteristics of a single antenna could be modified to support the two communication modes. FIG. 3 illustrates an embodiment of such an antenna device. As illustrated, antenna 310 is coupled to control element 330, which is designed to control diode 320. In a conventional communication mode, diode 320 would be inactive and the entire antenna 310 would be capable of radiating electromagnetic energy. In a close-proximity communication mode, on the other hand, control element 330 would activate diode 320, which would therefore short circuit a part of antenna 310. Through this process, the characteristics of antenna 310 would be changed, thereby altering the antenna's ability to match the impedance of "free space". Based on the design of the remaining portion of antenna 310 that is active, a relatively poor "far field" radiator would result that would support the close-proximity communication.

In yet another embodiment, the close-proximity communication mode can be supported by other transceiver elements that relied on other forms of coupling such as magnetic coupling. This alternative forms of coupling would enable the device to securely communicate information to another device in close proximity using a form of wireless communication that works in tandem with a conventional antenna design.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A communication method in a wireless device, comprising:
    communicating from the wireless device to a first device using a first antenna, said communication including information that enables initiation of a change in communication mode of the wireless device to a close proximity communication mode;
    switching in the wireless device a coupling of a transmission module from said first antenna to a second antenna, wherein said second antenna is designed for communication by the wireless device to a second device in close proximity to the wireless device, said second antenna having a first transmission performance level when not in close proximity to said second device and a second transmission performance level when in close proximity to said second device, said second transmission performance level being greater than said first transmission performance level; and
    communicating from the wireless device to said second device using said second antenna, said communication to said second device including confidential information that is restricted from said communication with said first device using said first antenna.

2. The method of claim 1, wherein said first antenna enables cellular communication.

3. The method of claim 1, wherein said second antenna is a capacitive plate.

4. The method of claim 1, wherein said first antenna and said second antenna are distinct antennas.

5. The method of claim 1, wherein said first antenna and said second antenna are part of a single antenna system.

6. The method of claim 5, wherein said single antenna system is a dipole antenna.

7. The method of claim 5, wherein said second antenna is a remainder of said first antenna after said first antenna is at least partially deactivated upon a change in a communication mode.

8. A wireless device, comprising:
    a first antenna that is designed to enable communication from the wireless device to a first device;
    a second antenna designed to enable communication by the wireless device to a second device in close proximity to the wireless device, said second antenna being designed for improved performance when in close proximity to a complementary antenna in said second device; and
    a switch that enables a change in coupling between a transmission module and one of said first and said second antennas, wherein a change in communication mode of the wireless device from said first antenna to said second antenna facilitates a communication between the wireless device and said second device of confidential information that is restricted from communication between the wireless device and said first device using said first antenna.

9. The wireless device of claim 8, wherein said first antenna enables cellular communication.

10. The wireless device of claim 8, wherein said second antenna is a capacitive plate.

11. The wireless device of claim 8, wherein said first antenna and said second antenna are distinct antennas.

12. The wireless device of claim 8, wherein said first antenna and said second antenna are part of a single antenna system.

13. The wireless device of claim 12, wherein said single antenna system is a dipole antenna.

14. The wireless device of claim 12, wherein said second antenna is a remainder of said first antenna after said first antenna is at least partially deactivated upon a change in said communication mode.

15. The wireless device of claim 8, wherein said second antenna enables a magnetic coupling between the wireless device and said second device.

16. The wireless device of claim 8, wherein said second antenna enables a capacitive coupling between the wireless device and said second device.

* * * * *